United States Patent [19]

Nath

[11] Patent Number: 4,907,133

[45] Date of Patent: Mar. 6, 1990

[54] ILLUMINATION DEVICE WITH A LIGHT GUIDE OF A LIQUID-FILLED PLASTIC FLEXIBLE TUBE

[76] Inventor: Günther Nath, Delpstrasse 27, Munich, Fed. Rep. of Germany, D-8000

[21] Appl. No.: 263,025

[22] Filed: Oct. 26, 1988

[51] Int. Cl.⁴ .............................................. F21V 8/00
[52] U.S. Cl. ..................................... 362/32; 362/318
[58] Field of Search ............... 362/32, 318; 350/96.32

[56] References Cited

U.S. PATENT DOCUMENTS

| | | | |
|---|---|---|---|
| 3,641,332 | 2/1972 | Reick et al. | 362/32 |
| 3,740,113 | 6/1973 | Cass | 350/96 R |
| 3,995,934 | 12/1976 | Nath | 350/96.32 |
| 4,009,382 | 2/1977 | Nath | 240/1 LP |
| 4,045,119 | 8/1977 | Eastgate | 350/96.32 |
| 4,561,043 | 12/1985 | Thompson | 362/32 |
| 4,747,662 | 5/1988 | Fritz | 350/96.32 |

FOREIGN PATENT DOCUMENTS 3704872 10/1987 Fed. Rep. of Germany .

*Primary Examiner*—Ira S. Lazarus
*Assistant Examiner*—Sue Hagarman
*Attorney, Agent, or Firm*—Brumbaugh, Graves, Donohue & Raymond

[57] ABSTRACT

In an illumination device comprising a light source and a light guide consisting of a flexible tube of fluoroplastic filled with liquid the filling liquid is a phenylmethyl silicone oil.

21 Claims, 1 Drawing Sheet

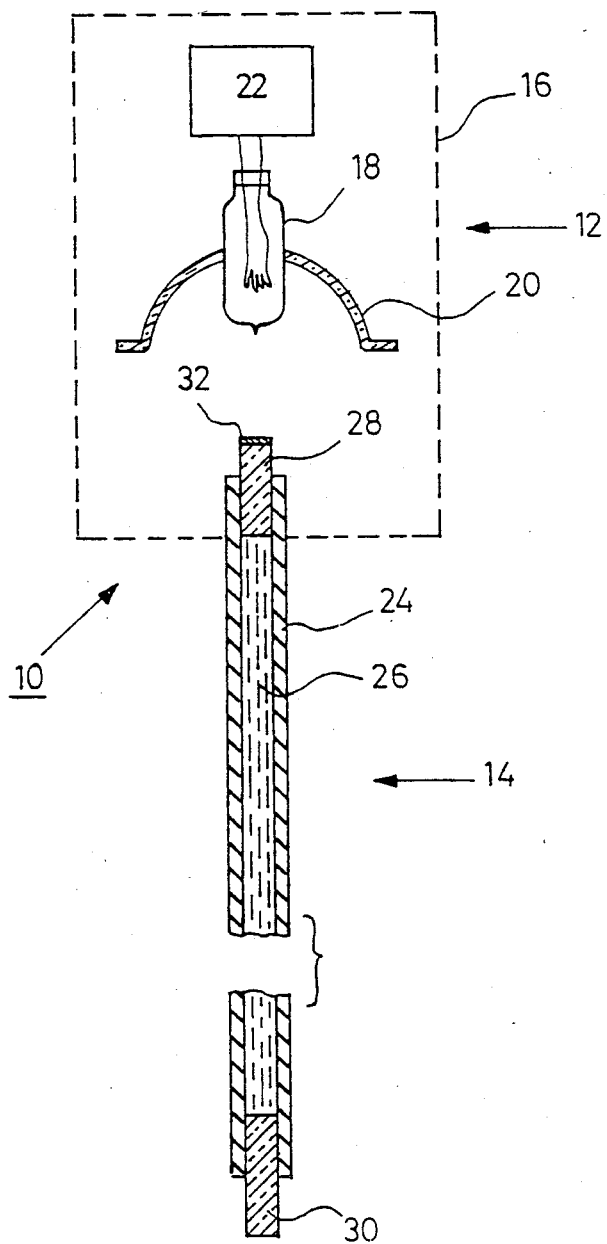

ILLUMINATION DEVICE WITH A LIGHT GUIDE OF A LIQUID-FILLED PLASTIC FLEXIBLE TUBE

FIELD OF THE INVENTION

The invention relates to an illumination device comprising a light guide including a plastic flexible tube filled with a transparent liquid.

DESCRIPTION OF THE RELATED ART

U.S. Pat. No. 4,009,382, incorporated by reference thereto, discloses an illumination device which is intended primarily for radiation polymerisation of dental synthetic resins by short-wave radiation, including the near ultraviolet. The filling liquid may consist of aqueous salt solutions or multivalent alcohols such as glycerine or ethylene glycol and should be as similar to water as possible, i.e. contain as many OH groups as possible so that the filling liquid wets as little as possible the flexible tube which surrounds it and consists of fluoroplastics, thereby largely avoiding diffusing away of the liquid. In the known apparatus the flexible tube material may be polytetrafluoroethylene (PTFE), perfluoralkoxy resin (PFA) or a copolymer of tetrafluoroethylene and hexafluoropropylene (FEP), the latter material preferably being used with a filling of an aqueous calcium fluoride solution. The known illumination device has proved to be excellent in the polymerisation of dental plastics. There are however uses, for example endoscopy, in which some requirements are not met, in particular with regard to the transmission in the visible spectral range.

The transmission in the known illumination device is reduced in particular in the red range by said OH groups. Above all, however, it has been found in practice that the transmission is not a constant factor but can change during the use depending on the bending of the flexible light guide tube.

This problem is encountered with the hitherto usual liquid light guides with FEP flexible tubes, in particular when they are made relatively thick. If a still more flexible fluoroplastic is used as tube material the then possible greater bending can impair the transmission even further.

SUMMARY OF THE INVENTION

It is an object of the present invention to provide an illumination device having a light waveguide which can be relatively thick, has good transmission in the visible spectral range, taking particular account of the red range, and the transmission of which is far less dependent on the bending than was hitherto the case.

According to the present invention in an illumination device comprising a light guide including a flexible tube which consists at least on the inner side of a carbon fluoropolymer or copolymer and which is sealed at the ends by transparent terminal windows and is filled with a transparent liquid, the filling liquid contains a phenylmethyl silicone oil.

The use of a silicone liquid in a flexible light guide is known per se. The invention is however based on the hitherto unexploited knowledge that due to the considerable difference between the refractive index of the flexible tube consisting of fluoroplastic (of the order of magnitude of 1.35 or less) and the refractive index (1.55-1.57) of the specific silicone oil used according to the invention, higher because of its phenyl groups, the hitherto observed transmission losses on bending of the tube are largely avoided. Surprisingly, this advantage is not offset by lower stability of the light guide although the silicone oil wets the flexible tube material to a substantially greater extent than the filling liquid of the known illumination devices.

Inspite of the wetting, due to the high viscosity of the silicone oil used no liquid loss through capillary action arises, and due to the extremely low vapour pressure of this liquid there is also no fear of evaporation through the inevitably permeable tube so that the light guide can operate for a long time without the bubble formation caused by liquid loss.

In the preferred field of use of medical endoscopy the silicone oil used has the additional advantage that it is physiologically harmless and this is important in view of the danger, which cannot be excluded, of a leak occuring inside the body.

A further optical advantage of the filling liquid according to the invention and its high refractive index is an extremely high numerical aperture (about 0.8). This means that substantially more light of a halogen lamp or other light source disposed at the light guide end can be transmitted, in particular when the terminal or end window consists of a glass with similarly high refractive index. The terminal window may be made for this purpose from a flint glass which at the same time has the advantageous property of filtering out short-wave light in the spectral range below about 320 nm, which could effect a photochemical decomposition of the filling liquid and thus might impair the desired long-term stability f the light guide.

BRIEF DESCRIPTION OF THE DRAWING

The single FIGURE of the drawing shows an example of embodiment of the invention.

DESCRIPTION OF THE PREFERRED EMBODIMENT

The illumination device 10 illustrated in the drawing includes a light source 12 and a light guide 14. The light source 12 comprises an only schematically indicated housing 16 in which a tungsten halogen lamp 18 is disposed which is provided with an ellipsoidal IR-transmissive reflector 20 and for example may be a commercially available 150W projection lamp. The lamp 18 is connected to a conventional power source 22 which is shown only schematically, which may for example contain a mains transformer and be operable by a foot switch (not shown) as is generally usual with endoscopic light sources.

The light guide 14 comprises a flexible tube 24, preferably of TFB (a ter or quater copolymer containing vinylidene fluoride units) or also FEP (copolymer of tetrafluoroethylene and hexafluoropropylene) or another suitable fluoroplastic having as low a refractive index as possible. The flexible tube 24 is filled with a transparent light-conducting liquid 26 and at the light entry end as well as at the light exit end sealed in each case by end or terminal windows 28 and 30 respectively, preferably consisting of flint or crown glass. The light entry end with the terminal window 28 is arranged in the focus area of the mirror 20 so that the light from the lamp 18 is focused into the light entry end of the light guide 14. The light guide 14 may have for example a length of 2-3 m. The internal diameter of the flexible tube 24 may for example be 2-20 mm.

The filling liquid consists of a phenylmethyl silicone oil of which the radicals (radical groups) saturating the free valences of the Si-0 chain should consist to more than 20% of phenyl groups because the latter lead to a high refractive index. The greater the difference between the refractive index of the filling liquid and the lower refractive index of the flexible tube the smaller the change in the transmission of the light guide when the flexible tube is bent. The chains of the filling liquid may contain three or more silicon atoms. At present trisiloxanes (i.e. chains with three Si atoms) are preferred which comprise four or five phenyl groups and consequently only four or three $CH_3$ groups, or mixtures of these two trisiloxanes. Such a filling liquid has a refractive index of about 1.55 or 1.58 which is thus at least 2/10 above the refractive index of the flexible tube.

The filling liquid of the illuminating device described here not only ensures a high degree of independence of the transmission on bending but is also particularly favourable for the transmissivity in the red range of the visible spectrum and is moreover suitable for low and high temperatures and has in addition the advantage of an extremely high optical aperture. A factor contributing to utilization of the latter advantage is said window 28 of highly refractive glass, the refractive index of which is of a magnitude similar to that of the filling liquid. There is thus optimum matching between the window and the filling liquid without appreciable reflection losses at the interfaces. In contrast to a quartz window which allows to pass photochemically active radiation beneath about 320 nm, the window 28 filters such radiation out.

For certain specific high-pressure arc discharge lamps which can be used as light source 12, and also for incandescent lamps or the like, it may be expedient to provide at the light entry side of the light guide a dielectric heat protection filter which is vapour deposited onto the end face of the window 28 facing the light source, as indicated at 32, but can also be arranged on its own support.

The end faces of the windows, in particular the outer end faces, may be provided with reflection-reducing dielectric coatings.

According to a particular feature the filling liquid of the illumination device described here may contain a fluorescent dye which should be soluble in the liquid. Preferable dyes for this purpose are for example perylene dyes or pigments, such as Lumogon OF, Orange 240 or Red 300 or Violet 570 (BASF) in a concentration of for example 0.02% or more or alternatively rhodamines etc. The fluorescent substance is selected so that it is stimulated to fluorescence by the stimulating light available and furnishes fluorescence radiation in a useful wavelength range. The fluorescent dye has the advantage that to generate the necessary light power no light need be coupled into the relatively small cross-section of the light guide end, it being possible instead to couple in stimulating light transversely of the tube longitudinal axis. Frequently, a large-area low-pressure gas-discharge lamp (fluorescent lamp) will suffice, and even with ambient light, including diffuse sunlight, illumination intensities can be achieved which are enough for many purposes. The low attenuation in the red range due to the filling liquid used is also important with regard to this advantage.

When using the light guide for a photovoltaic generator one or both ends of the plastic flexible tube can be sealed by a plug at the inner face of which a silicon photocell is disposed which is in direct contact with the inert filling liquid. This avoids the light losses otherwise occurring at the interfaces of a transparent window. In this use and other uses in which the radiation stimulating the fluorescence of the dissolved dye is not introduced axially through an end-face window but radially through the plastic tube, a mirror may be arranged at one end of the tube, thereby considerably increasing the intensity of the fluorescent radiation available at the other end.

I claim:

1. An illumination device comprising a light guide including a flexible tube which consists at least at the inner side of a carbon fluoropolymer of copolymer and which is sealed at the ends by transparent terminal windows and is filled with a transparent liquid, wherein the filling liquid contains a phenylmethyl silicone oil wherein the silicone oil has valences which are saturated by molecular radicals, more than 20% of said radicals being phenyl groups.

2. An illumination device according to claim 1, wherein the silicone oil contains chains having more than two silicon atoms.

3. An illumination device according to claim 1, wherein the silicone oil consists of trisiloxanes having four or five phenyl groups or mixtures thereof.

4. An illumination device according to claim 1, wherein the filling liquid contains a fluorescent dye.

5. An illumination device according to claim 4, wherein at one end of the plastic flexible tube a reflector is disposed.

6. An illumination device according to claim 4, wherein at at least one end of the plastic flexible tube a photocell is arranged adjoining the filling liquid.

7. An illumination device according to claim 1, wherein the flexible tube contains a material selected from the group consisting of a copolymer containing vinylidene fluoride units, a copolymer of tetrafluoroethylene and hexafluoropropylene and a perfluoralkoxy resin.

8. An illumination device according to claim 1 comprising a light source which is optically coupled to a light entry end of the light guide, wherein at least the terminal window of the light guide facing the light source consists of a glass which absorbs beneath about 320nm and has a similar refractive index to the filling index.

9. An illumination device according to claim 8, wherein said terminal window consists of flint glass.

10. An illumination device according to claim 8, wherein the light source contains a tungsten halogen incandescent lamp.

11. An illumination device according to claim 1 comprising a light source which is optically coupled to the light guide and which contains a tungsten halogen lamp.

12. An illumination device wherein the filling liquid contains a phenylmethyl silicone oil and a perylene dye.

13. An illumination device according to claim 12, wherein the silicone oil contains a chains having more than two silicon atoms.

14. An illumination device according to claim 12, wherein the silicone oil consists of trisiloxanes having four or five phenyl groups or mixtures thereof.

15. An illumination device according to claim 12, wherein at one end or the plastic flexible tube a reflector is disposed.

16. An illumination device according to claim 12, wherein at least one end of the plastic flexible tube a photocell is arranged adjoining the filling liquid.

17. An illumination device according to claim 12, wherein the flexible tube contains material selected from the group consisting of a copolymer containing vinylidene fluoride units (TFB), a copolymer of tetrahydroflouroethylene and hexaflouropropylene and perfluoralkoxy resin (PFA).

18. An illumination device according to claim 12 comprising a light source which is optically coupled to a light entry end of the light guide, wherein at least the terminal window of the light guide facing the light source consists of a glass which absorbs beneath about 320nm and has a similar refractive index to the filling index.

19. An illumination device according to claim 18, wherein said terminal window consists of flint glass.

20. An illumination device according to claim 18, wherein the light source contains a tungsten halogen incandescent lamp.

21. An illumination device according to claim 12 comprising a light source which is optically coupled to the light guide and which contains a tungsten halogen lamp.

* * * * *

UNITED STATES PATENT AND TRADEMARK OFFICE
CERTIFICATE OF CORRECTION

PATENT NO. : 4,907,133
DATED : March 6, 1990
INVENTOR(S) : Gunther Nath

It is certified that error appears in the above-identified patent and that said Letters Patent is hereby corrected as shown below:

Column 4, line 58, after "device" insert

--according to claim 1,--.

Signed and Sealed this

Fifteenth Day of October, 1991

Attest:

HARRY F. MANBECK, JR.

Attesting Officer

Commissioner of Patents and Trademarks